United States Patent [19]

Forbes et al.

[11] Patent Number: 5,378,187
[45] Date of Patent: Jan. 3, 1995

[54] DOLL STAND

[75] Inventors: John R. H. Forbes, Philadelphia; Peter A. Maryanski, West Chester; Barry Matus, Springfield, all of Pa.

[73] Assignee: Franklin Mint Company, Franklin Center, Pa.

[21] Appl. No.: 919,661

[22] Filed: Jul. 24, 1992

[51] Int. Cl.⁶ .............. A63H 3/00; A63H 33/06; B25G 3/00; A47B 97/00
[52] U.S. Cl. .................. 446/268; 446/118; 403/254; 403/353; 248/224.4; 248/500
[58] Field of Search ............ 446/268, 279, 280, 281, 446/283, 284, 331, 332, 374, 376, 390, 118, 119, 120, 121, 122, 97, 99, 101; 403/254, 353, 406.1, 405.1; 248/231.9, 223.4, 224.4, 500

[56] References Cited

U.S. PATENT DOCUMENTS

| | | |
|---|---|---|
| 834,452 | 10/1906 | Beiser . |
| 925,273 | 6/1909 | Beiser . |
| 1,252,779 | 1/1918 | Chrapla . |
| 1,273,605 | 7/1918 | Goldman . |
| 1,551,050 | 8/1925 | Parsons . |
| 1,686,061 | 10/1928 | Allinger ........................ 446/280 |
| 2,019,651 | 11/1935 | Bonanno ........................ 446/282 |
| 2,024,553 | 12/1935 | Tisdall . |
| 2,107,672 | 6/1936 | Lang . |
| 2,175,789 | 10/1938 | Young . |
| 2,336,467 | 12/1943 | Cohen . |
| 2,537,621 | 1/1951 | Busom . |
| 2,637,138 | 5/1953 | Doran et al. . |
| 2,767,517 | 10/1956 | Hooper . |
| 3,009,284 | 11/1961 | Ryan . |
| 3,168,227 | 2/1962 | Osmond . |
| 3,198,408 | 8/1965 | Benner . |
| 3,270,996 | 9/1966 | Churchill et al. ............ 248/223.4 |
| 3,287,847 | 11/1966 | Gardel et al. . |
| 3,300,108 | 1/1967 | Schumer . |
| 3,310,267 | 3/1967 | Koehler . |
| 4,197,358 | 4/1980 | Garcia . |
| 4,622,019 | 11/1986 | Katzman et al. ............ 446/268 X |
| 4,654,274 | 3/1987 | DeMars . |
| 4,723,931 | 2/1988 | Allen et al. ..................... 446/268 |
| 4,828,442 | 5/1989 | Duran .......................... 403/406.1 X |
| 5,024,611 | 6/1991 | Eckerle et al. . |

FOREIGN PATENT DOCUMENTS

| | | | |
|---|---|---|---|
| 545330 | 7/1956 | Italy ............................. 248/224.4 |
| 2168902 | 7/1986 | United Kingdom ............ 446/121 |
| 1183140 | 10/1985 | U.S.S.R. ........................ 446/121 |

Primary Examiner—Max Hindenburg
Assistant Examiner—D. Neal Muir
Attorney, Agent, or Firm—Seidel, Gonda, Lavorgna & Monaco

[57] ABSTRACT

A doll and doll stand combination is adapted for removable attachment of the doll to the stand. The doll has at least one foot which is adapted to rest on the stand. The foot has a hollow sector which defines a bottom wall, with a slot extending through the wall into the hollow. The stand has a plug adapted to be inserted into the slot, and includes a resilient flange adapted to extend over the inner face of the bottom wall when the plug is inserted. The flange has sufficient resiliency to prevent the plug from being extracted from the slot by the weight and leverage of the doll and stand, but allows the plug to be pulled out of the slot by a force that will not break the bottom wall.

13 Claims, 3 Drawing Sheets

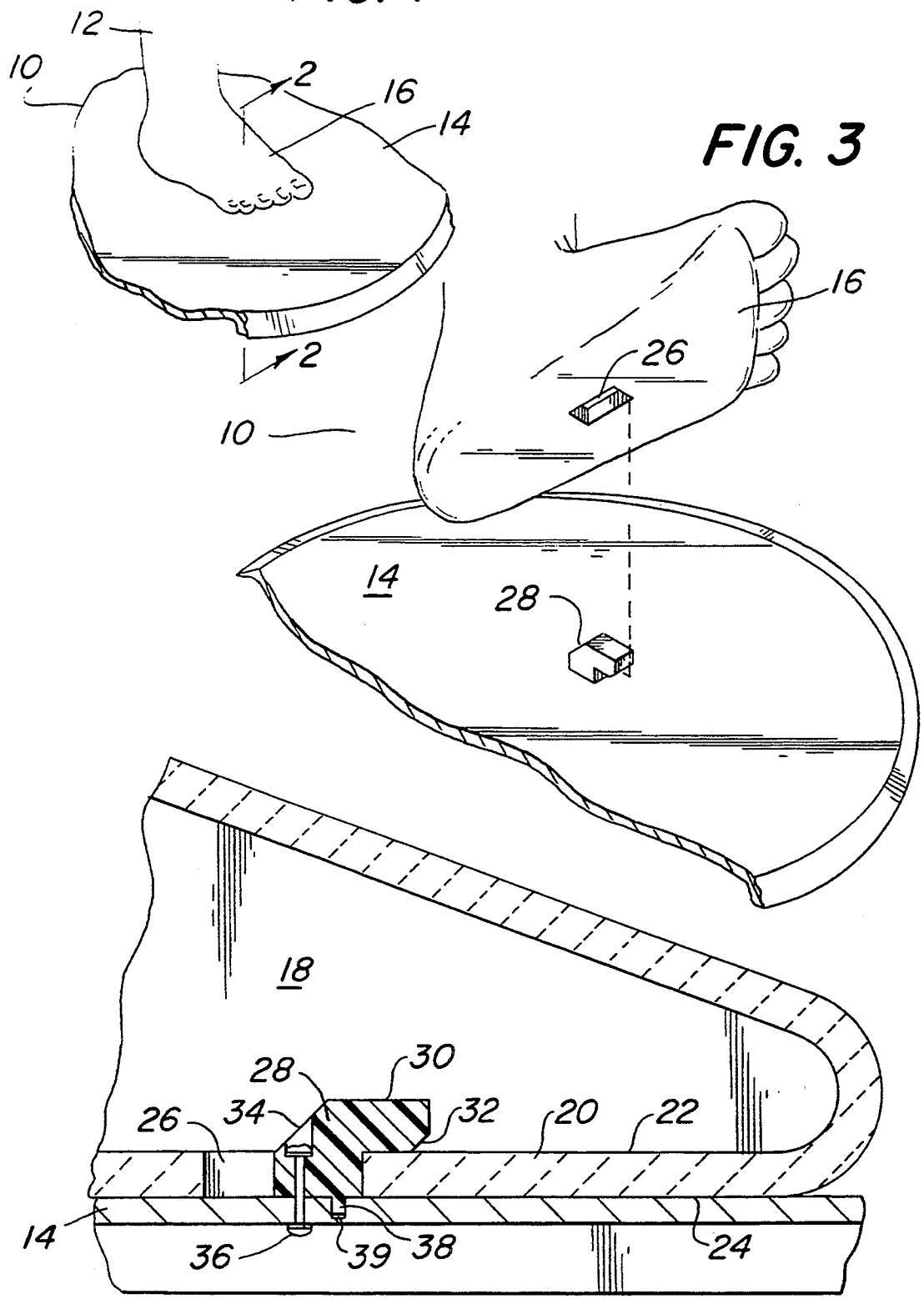

5,378,187

DOLL STAND

TECHNICAL FIELD

This invention is related to the general field of dolls, figurines, and other miniature statuary. It is related to the specific field of detachable stands and bases for such objects.

BACKGROUND ART

Fine porcelain dolls and other statuary are prized by collectors and as display pieces. They may be permanently attached to a display stand, but many collectors would prefer that the doll be conveniently removable from the stand for a variety of reasons. Thus, dolls have been attached to the stands by wire loops, pins projecting into sleeves, magnet and ferrous plate, and other constructs.

An object of the present invention is to provide an improved removable attachment of doll to stand, wherein the doll can be easily attached and removed without damage to either the doll or to the stand, and which provides either fixed or rotatable alignment whith respect to the stand.

SUMMARY DISCLOSURE OF THE INVENTION

A doll and doll stand combination is adapted for removable attachment of the doll to the stand. The doll has at least one foot which is adapted to rest on the stand. The foot has a hollow sector which defines a bottom wall, and a slot extending through the wall. The stand has a plug which is adapted to be inserted into the slot, and which includes a resilient flange adapted to extend over the inner face of the wall when the plug is inserted. The flange has sufficient resiliency to prevent the plug from being extracted from the slot by the doll's own weight and leverage, but allows the human user to pull or slide the plug out of the slot with forces that do not break or crack the bottom wall.

Two prefered embodiments are disclosed. A first embodiment is adapted to hold the doll in a fixed alignment with respect to the stand, while the second embodiment permits the doll to be mounted on the stand at a selectable alignment angle with respect to the stand. In the first embodiment, the slot is generally rectangular and the resilient flange is a hook flange extending from the plug at a height above the stand substantially equal to the thickness of the bottom wall, with a tapered end to facilitate insertion of the flange over the inner face of the bottom wall. In the second embodiment, the slot is circular and the plug has a hollow split-cone flange extending from it at a height substantially equal to the thickness of the bottom wall and projecting radially outward from the plug wider than the circumference of the slot.

BRIEF DESCRIPTION OF THE DRAWINGS

For the purpose of illustrating the invention, the drawings show a form which is presently preferred; it being understood, however, that this invention is not limited to the precise arrangements and instrumentalities shown.

FIG. 1 is a perspective view of a doll's foot attached to a doll stand.

FIG. 2 is a section view along the plane and in the direction of the arrows 2—2 of FIG. 1, disclosing one embodiment of the present invention.

FIG. 3 is an exploded view of the doll's foot and stand of FIG. 1, disclosing a perspective of the invention as embodied in FIG. 2.

BEST MODE FOR CARRYING OUT THE INVENTION

Figure 4:
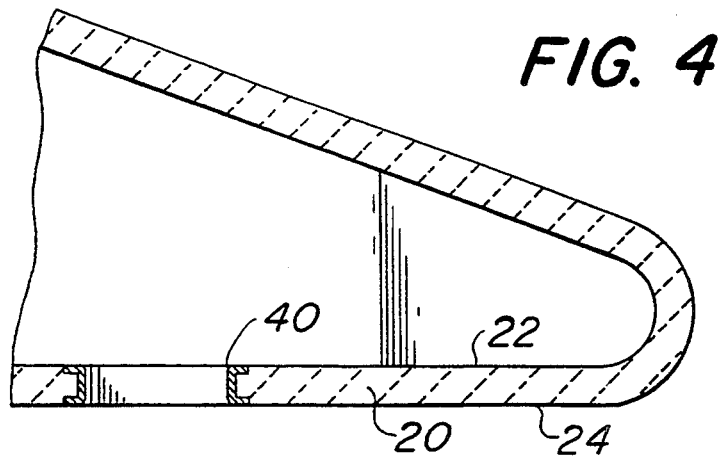
FIG. 4 is a section view of a doll's foot disclosing showing the optional addition of a protective bushing around the slot.

FIG. 1 shows a representative doll and stand combination (10). The doll (12) depicted in the drawing is a human figurine, as apparent from the depicted leg and foot detail. However, it will be understood that the term "doll" is used in this description and in the claims for brevity, and is meant to include any figurine or statuary, without regard to whether it depicts a human, animal, or inanimate object. The stand (14) is depicted in the drawings as a flat base with a raised center platform to prevent rocking and to allow clearance for the bottom of the plug, but will be understood to include any other appropriate platform.

In the depicted embodiments of the present invention, the doll's foot (16) is attached to the stand (14). It should be understood that the term "foot" is also used in this description and in the claims for brevity, as it literally describes the most common embodiment, but the term will be understood to include as its equivalent any suitable appendage, such as an animal's tail, the base of an inanimate object, the trailing train of a gown, or any other significant contact area between the doll and the stand. For purposes of the invention, it is only necessary that the doll have at least one such "foot" (16) adapted to rest on the stand, although it could have additional contact areas with the stand.

Figure 6:
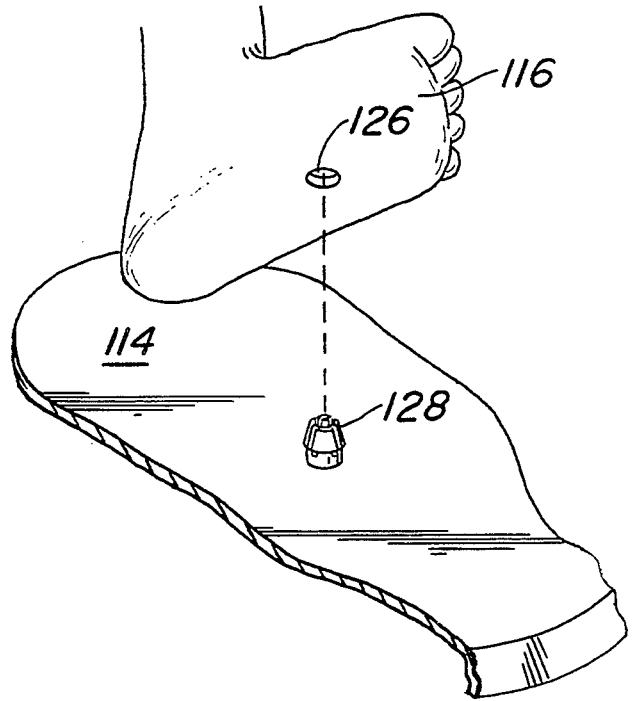
FIG. 6 is an exploded view of a doll's foot and stand similar to FIG. 3, disclosing a perspective of the invention as embodied in FIG. 5.
Figure 5:
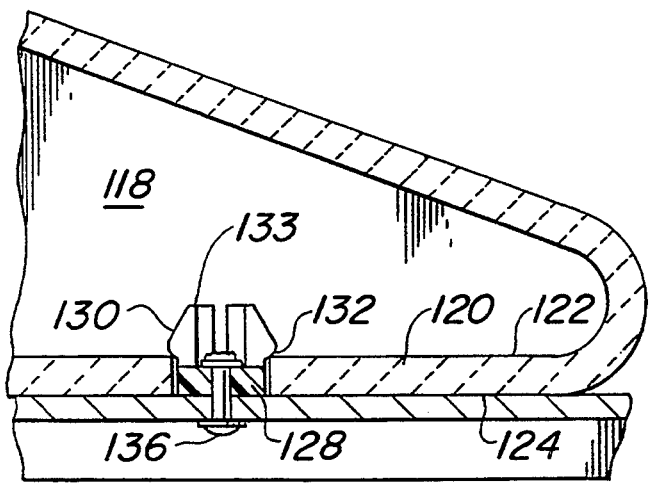
FIG. 5 is a section view of a doll's foot along a plane and in a direction similar to FIG. 2, disclosing an alternative embodiment of the invention.

Two distinct embodiments are depicted; FIGS. 2 and 3 depict an embodiment which is adapted to hold the doll in a fixed alignment with respect to the stand, and FIGS. 5 and 6 depict an embodiment which is adapted to permit the doll to mounted on the stand at a selectable alignment angle or to be rotated through an arc of alignment with respect to the stand. However, both embodiments share the elements which are included in the invention, as will be apparent from their detailed description which follows.

Turning now to FIGS. 2 and 3, the doll's entire foot is shown to be hollow, as is common for many figurines made by a mold process. For purposes of this invention, it is only necessary that the foot have a hollow sector (18) wherein a portion of the foot defines a bottom wall (20) having an inner face (22) and an outer face (24).

In the embodiment of FIGS. 2 and 3, a rectangular slot (26) extends through the bottom wall (20) into the hollow sector (18). The stand (14) has a matching plug (28) which is adapted to be inserted through the slot. The plug (28) has a resilient hook flange (30) adapted to extend over the inner face (22) of the bottom wall when the plug is inserted into the slot and the doll is moved backward to slide the flange (30) over the inner face. The flange (30) has sufficient resilient compression against the bottom wall to prevent the plug from being extracted from the slot by the weight and leverage of the doll and stand alone, as might be applied when the combination is lifted or moved, but allows the human user to slide the plug back in the slot and to extract the doll from the stand by forces which are less than that which would break or crack the bottom wall.

In the FIGS. 2 and 3 embodiment, the fixed alignment of the doll to the stand is achieved by the configuration of the plug and hook flange. The lower portion of the plug (28) is square, and the length of its sides is essentially the narrow width of the slot (26). (It will be apparent that the plug need not be square, but should have two parallel sides spaced apart by substantially the with between the two longer sides of the rectangular slot.) Thus, the foot is unable to rotate around the plug. The bottom of the hook flange (30) extends from the square plug at a height above the stand which substantially equal to the thickness of the bottom wall (20), and projects from the plug in a direction aligned with the longer parallel sides of the slot, herein toward the toe. Thus, the plug may be easily inserted in the slot such that the bottom of the flange is at essentially even height with the inner face (22), and the foot then moved backward to slide the bottom wall (20) under the flange. To facilitate this sliding motion, the flange has a tapered end (32), the taper angling toward the plug at a bottom edge of the flange, as shown in FIG. 2. The opposite end of the flange may also have a sloped shoulder (34) to assist in inserting the plug into the slot.

The plug and flange may preferably be an integral nylon unit. The stand will frequently be metal. In such construction, the plug may be attached to the stand by a bolt, washer, and nut combination (36) or by an equivalent rivet or screw combination, disposed through a recessed bore in the plug. To keep the plug from rotating with respect to the stand, the plug may be formed with a small boss (38) to mate into a conforming trough (39) in the stand, thus providing a two-point attachment that prevents rotation.

Although a rectangular slot and plug are described as the preferred embodiment for a fixed orientation of the doll relative to the stand, it will be apparent that other equivalent shapes could be used, such as an oval or a wedge-shaped slot, provided that plug has sufficient conforming dimensions to prevent it from rotating relative to the slot after it is inserted.

FIGS. 5 and 6 depict a second embodiment which is adapted to permit the doll to be mounted at selectable alignment angles with respect to the stand. (To prevent wear of the plug, it is preferable that the doll not be rotated to the desired alignment after it is mounted on the stand.) It differs from the previous embodiment in that the slot (126) is generally circular and the plug (128) is also circular with a resilient split-cone flange (130). The flange (130) begins extending from the plug at a height above the stand (114) which is substantially equal to the thickness of the bottom wall (120), and projects radially outward from the plug to form a circumference wider than the circumference of the slot. The cone is split into sections to allow clearance in the base for the doll foot. The depicted plug has four segments, but a plug with at least two segments is adequate. The hardness of the nylon or plastic plug material is related to the number of segments in that the hardness of the material and/or the sectional thickness should be increased as the number of segments is increased. In the depicted embodiment, the four segments of the cone taper upward and inward such that the diameter of its top face (133) is less than the diameter of the slot, thus providing a centering alignment when the plug is inserted into the slot. When the plug is being inserted, the four split segments compress to allow the widest circumference to pass through the slot, and then expand to extend over the inner face of the bottom wall.

The flange also has a bottom tapered portion (132) extending from the plug to the widest circumference of the flange to facilitate the recompression of the split segments when sufficient force is applied to pull the plug out of the slot. The resilience of the segments can be selected to require a greater force to remove the plug than would be caused by the weight and leverage of the doll and stand alone, yet allow the human user to pull the doll from the stand without damaging the bottom wall.

Figure 7A:
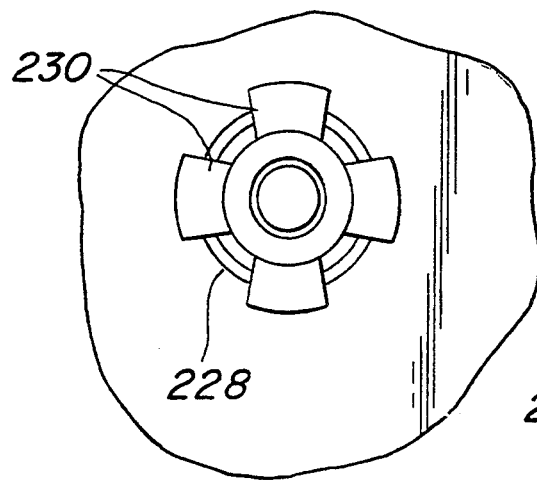
FIG. 7A is a top view of an alternative cone plug which may be used in place of item 128 of FIGS. 5 and 6.
Figure 7B:
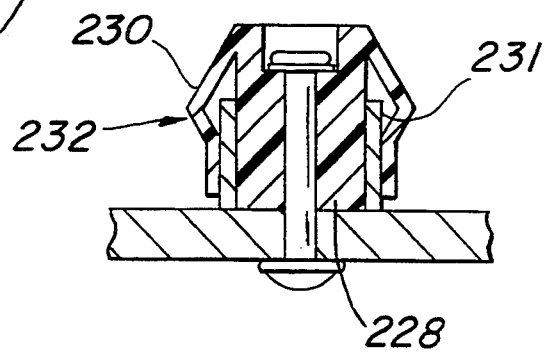
FIG. 7B is a section view of the plug and base depicted in FIG. 7A.
Figure 8A:
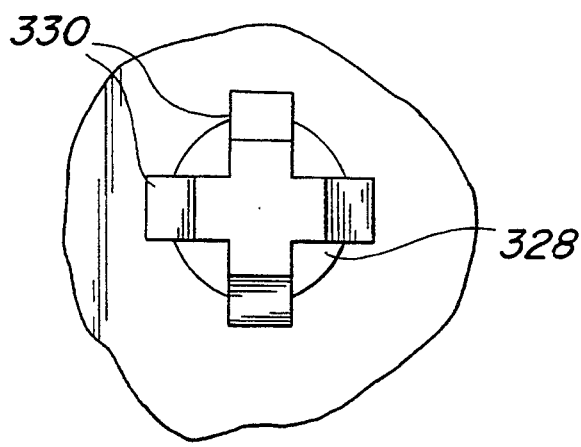
FIG. 8A is a top view of another alternative cone plug which may be used in place of item 128 of FIGS. 5 and 6.
Figure 8B:
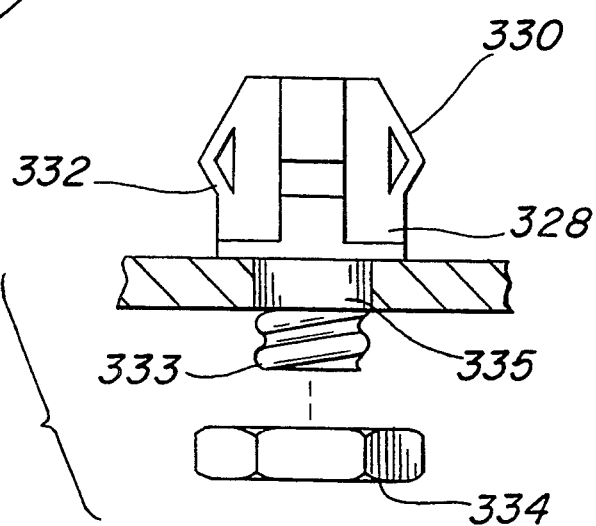
FIG. 8B is a section view of the plug and base depicted in FIG. 8A.

Although a split-cone flange is described as the preferred embodiment, other types should be considered as its equivalent for use with a circular slot, as for example, skirt flaps (230) and a collar (231) around the plug (228), as depicted in FIGS. 7A and 7B. Each skirt flap has a tapered flange portion (232) to facilitate insertion and extraction, while the collar allows vertical movement of the skirt flaps. A somewhat similar equivalent is depicted in FIGS. 8A and 8B, where four hollow flange segments (330) extend directly from the plug (328), and each segment has a hollow space inside an outwardly tapered flange area (332). This embodiment plug is attached to the base by threaded shaft (333) and nut (334). The shaft has a square neck (335) where it fits through the base to prevent the plug from rotating.

There are undoubtedly other equivalent shapes. It is only required that the flange be insertable into the slot and that it extend over the inner face of the bottom wall when the plug is inserted into the slot, and that it have sufficient resilience to prevent the plug from being extracted from the slot by the weight and leverage of the doll and stand alone, but allow the user to pull the plug from the stand by a force less than that which would break or crack the bottom wall.

It will be apparent that the circular slot and plug permit the doll to be rotated through a 360° arc of alignment with respect to the stand before the plug is inserted into the slot, thus allowing a selectable alignment angle of the doll to the stand. Alignment could be limited to a specific arc segments by limit stops on the stand. This embodiment will also allow forced rotation of the doll with respect to the stand after the plug is inserted, although in practice such forced rotation should be discouraged in order to prevent the plug fit from loosening and allowing the doll to wobble.

When used with fine porcelain or china figurines, the vulnerable edges of the slot may be protected by a bushing (40), as shown on FIG. 4. The bushing may be of soft metal or nylon, and overlaps the edges of the slot.

INDUSTRIAL APPLICABILITY

The invention is expected to be used primarily by crafters of fine porcelain, glass, or china dolls for collectors and for display pieces.

The present invention may be embodied in other specific forms without departing from the spirit or essential attributes thereof and, accordingly, reference should be made to the appended claims, rather than to the foregoing specification, as indicating the scope of the invention.

We claim:

1. A doll and doll stand combination adapted for removable attachment of a doll to a stand, comprising:
   (a) the doll having at least one foot adapted to rest on the stand;
   (b) said foot having a hollow sector wherein a portion of the foot defines a bottom wall having an inner face and an outer face;
   (c) a slot extending through the bottom wall into the hollow sector;
   (d) the stand having a plug which is adapted to be inserted through said slot; and
   (e) said plug having a resilient, compressible flange means adapted to extend over the inner face of the bottom wall when the plug is inserted into the slot.

2. A doll and stand combination as in claim 1, further comprising said flange means having sufficient resilient compression against the bottom wall to prevent the plug from being extracted from the slot by the weight and leverage of the doll and stand, but to allow the plug to be separated from the stand by forces less than that which would damage the bottom wall.

3. A doll and stand combination as in claim 2, further comprising said slot and plug being adapted to hold the doll in a fixed alignment with respect to the stand.

4. A doll and stand combination as in claim 3, wherein the slot is generally rectangular, and the plug has two opposite sides spaced apart by substantially the width between the two longer sides of the slot.

5. A doll and stand combination as in claim 4, further comprising the resilient, compressible flange means including a hook flange extending from the plug at a height above the stand substantially equal to the thickness between the inner and outer faces of the bottom wall, and projecting from the plug in a direction aligned with said opposite sides.

6. A doll and stand combination as in claim 5, further comprising said hook flange having a tapered end away from the plug, said tapered end facilitating insertion of the flange over the inner face of the bottom wall.

7. A doll and stand combination as in claim 6, further comprising a protective bushing surrounding the edges of the slot.

8. A doll and stand combination as in claim 1, further comprising said slot and plug being adapted to permit the doll to be selectably aligned through an arc of alignment with respect to the stand, the slot being generally circular, the resilient, compressible flange means projecting radially outward from the plug to form a circumference wider than the circumference of the slot and including a first portion which tapers upward and inward and a second portion which tapers downward and inward.

9. A doll and stand combination as in claim 2, further comprising said slot and plug being adapted to permit the doll to be selectably aligned through an arc of alignment with respect to the stand, the slot being generally circular, the resilient, compressible flange means projecting radially outward from the plug to form a circumference wider than the circumference of the slot and including a first portion which tapers upward and inward and a second portion which tapers downward and inward.

10. A doll and stand combination as in claim 9, wherein the arc is 360°.

11. A doll and stand combination as in claim 8, wherein the flange is a cone split into at least two segments.

12. A doll and stand combination as in claim 11, wherein the diameter of the cone at its top is less than the diameter of the slot to provide a centering alignment when the plug is inserted into the slot.

13. A doll and stand combination as in claim 9, further comprising a protective bushing surrounding the edges of the slot.

* * * * *